United States Patent
Yishay et al.

(10) Patent No.: US 10,084,876 B2
(45) Date of Patent: *Sep. 25, 2018

(54) SYSTEM AND METHOD FOR CONDITIONAL ANALYSIS OF NETWORK TRAFFIC

(71) Applicant: Verint Systems Ltd., Herzliya Pituach (IL)

(72) Inventors: Yitshak Yishay, Revava (IL); Eithan Goldfarb, Ness Ziona (IL)

(73) Assignee: Verint Systems Ltd., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,122

(22) Filed: Mar. 13, 2017

(65) Prior Publication Data

US 2017/0251074 A1    Aug. 31, 2017

Related U.S. Application Data

(63) Continuation of application No. 14/527,894, filed on Oct. 30, 2014, now Pat. No. 9,628,580.

(30) Foreign Application Priority Data

Oct. 30, 2013 (IL) .......................... 229154

(51) Int. Cl.
G06F 15/173    (2006.01)
H04L 29/08    (2006.01)
(Continued)

(52) U.S. Cl.
CPC ........ *H04L 67/2842* (2013.01); *H04L 43/062* (2013.01); *H04L 67/02* (2013.01);
(Continued)

(58) Field of Classification Search
CPC ............ H04L 63/1416; H04L 63/1425; H04L 67/2842; H04L 43/04; H04L 43/062; G06F 21/56
See application file for complete search history.

(56) References Cited

U.S. PATENT DOCUMENTS

5,689,442 A    11/1997    Swanson et al.
6,404,857 B1    6/2002    Blair et al.
(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.
(Continued)

*Primary Examiner* — Tauqir Hussain
*Assistant Examiner* — Austin Moreau
(74) *Attorney, Agent, or Firm* — Meunier Carlin & Curfman LLC

(57) ABSTRACT

Embodiments that are described herein provide improved methods and systems for analyzing network traffic. The disclosed embodiments enable an analytics system to perform complex processing to only new, first occurrences of received content, while refraining from processing duplicate instances of that content. In an embodiment, the analytics results regarding the first occurring content are reported and cached in association with the content. For any duplicate instance of the content, the analytics results are retrieved from the cache without re-processing of the duplicate content. When using the disclosed techniques, the system still processes all first occurring content but not duplicate instances of content that was previously received and processed. In the embodiments described herein, input data comprises communication packets exchanged in a communication network.

18 Claims, 2 Drawing Sheets

(51) Int. Cl.
*H04L 12/26* (2006.01)
*H04L 29/06* (2006.01)
*G06F 12/0813* (2016.01)

(52) U.S. Cl.
CPC .... *G06F 12/0813* (2013.01); *G06F 2212/154* (2013.01); *G06F 2212/60* (2013.01); *G06F 2212/62* (2013.01); *H04L 63/1408* (2013.01)

(56) References Cited

U.S. PATENT DOCUMENTS

| | | | |
|---|---|---|---|
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 8,079,084 | B1 | 12/2011 | Huang et al. |
| 2008/0014873 | A1 | 1/2008 | Krayer et al. |
| 2008/0072325 | A1 | 3/2008 | Repasi et al. |
| 2008/0261192 | A1 | 10/2008 | Huang et al. |
| 2008/0285464 | A1 | 11/2008 | Katzir |
| 2010/0191805 | A1 | 7/2010 | Lu et al. |
| 2012/0271908 | A1 | 10/2012 | Luna et al. |
| 2013/0127618 | A1 | 5/2013 | Sheleheda et al. |
| 2013/0159395 | A1 | 6/2013 | Backholm et al. |
| 2013/0247131 | A1 | 9/2013 | Rathor et al. |
| 2014/0025841 | A1 | 1/2014 | Li et al. |
| 2014/0283066 | A1 | 9/2014 | Teddy et al. |

OTHER PUBLICATIONS

Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.
Verint Systems Inc., "Mass Link Analysis: Conceptual Analysis," Jun. 2007, 21 pages.
Verint Systems Inc., "Mass Link Analysis: Solution Description," Dec. 2008, 16 pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.

SYSTEM AND METHOD FOR CONDITIONAL ANALYSIS OF NETWORK TRAFFIC

CROSS-REFERENCE TO RELATED APPLICATIONS

The present application claims is a continuation of, and claims the benefit of priority to, U.S. patent application Ser. No. 14/527,894, entitled "SYSTEM AND METHOD FOR CONDITIONAL ANALYSIS OF NETWORK TRAFFIC," filed Oct. 30, 2014, whose disclosure is incorporated by reference herein.

FIELD OF THE DISCLOSURE

The present disclosure relates generally to network traffic processing, and particularly to methods and systems for conditional analysis of network traffic.

BACKGROUND

Some systems that monitor and process network traffic, such as analytics systems, are required to cope with large amounts of traffic. Often, increased traffic volumes are created by popular content, which is carried over the network each time the content is delivered or consumed by end users of the network. The increased traffic volumes result in increased demands on the systems hardware and computational resources.

SUMMARY OF THE DISCLOSURE

An embodiment that is described herein provides a method, including receiving network traffic that carries content items for processing by an analytics system. A content item is extracted from the network traffic. The content item is examined to find whether it is a duplicate of previous content that was already processed by the analytics system and cached. When the content item is found to duplicate the previous content, a cached analytics outcome of the content item is retrieved and output. When the content item is found not to duplicate any previous content, the analytics system is caused to produce the analytics outcome for the content item, and the analytics outcome is cached.

In some embodiments, extracting the content item includes deriving a respective unique identifier for the content item, and finding that the content item does not duplicate includes validating that the unique identifier does not match any identifier in a cache memory that caches identifiers of previous content items that were processed by the analytics system. In other embodiments the method includes, in response to finding that the content item does not duplicate, caching the unique identifier of the content item, and the analytics outcome produced for the content item by the analytics system, in the cache memory in association with the unique identifier. In yet other embodiments, deriving the unique identifier includes composing the unique identifier from at least part of a Uniform Resource Locator (URL) in which the content item resides.

In an embodiment, the at least part of the URL is chosen to exclude a variable section of the URL. In another embodiment, extracting the content item includes extracting a traffic transaction created by servers that are infected by malware, and deriving the unique identifier includes deriving a pattern of the traffic transaction. In yet another embodiment, deriving the unique identifier includes calculating a digital signature over at least part of the content item.

In some embodiments, calculating the digital signature includes calculating the digital signature over only a predefined portion of the content item. In other embodiments, the predefined portion is chosen to exclude a section of the content item that varies among duplicates of the content item. In yet other embodiments, the unique identifier includes a first signature and a second signature, which is stronger than the first signature, and validating that the unique identifier does not match any identifier in the cache memory includes checking the second signature only if checking the first signature is not sufficient for deciding that the identifier does not match.

In an embodiment, the method further includes, for a given content item, counting a number of matching occurrences of the given content item, and caching the number of matching occurrences in the cache memory in association with the unique identifier of the given content item, for use by the analytics system. In another embodiment, caching the number of matching occurrences includes deleting from the cache memory the given content identifier if the number of matching occurrences during a predefined duration is lower than a predefined threshold. In yet another embodiment, the number of matching occurrences is multiplied by a weight factor that is based on a processing time of the content item.

In some embodiments, extracting the content item includes recognizing HTTP transactions in the network traffic and extracting the content item from the HTTP transactions. In other embodiments, the content item includes a multimedia content.

In an embodiment, the analytics system produces analytics outcomes based on an analytics rule, and upon changing the analytics rule, updating cached analytics outcomes for the content items for which the analytics rule was applied. In another embodiment, changing the analytics rule includes removing the analytics rule, and updating the analytics outcomes includes deleting the cached content items for which the analytics rule was applied. In yet another embodiment, changing the analytics rule includes changing the analytics rule with respect to a given content type, and updating the analytics outcomes includes removing the cached content items of the given content type.

In some embodiments, changing the analytics rule includes replacing the analytics rule with a new analytics rule, which is different from the analytics rule, and updating the analytics outcomes includes producing new analytics outcomes by applying the new analytics rule to the content items and replacing the cached analytics outcomes with the new analytics outcomes.

There is also provided, in accordance with an embodiment that is described herein, an apparatus including an input circuit and a processor. The input circuit is configured to receive network traffic that carries content items for processing by an analytics system. The processor is configured to extract a content item from the network traffic, to find whether the content item is a duplicate of a previous content that was already processed by the analytics system and cached, to retrieve and output a cached analytics outcome of the content item when the content item is found to duplicate the previous content, and, when the content item is found not to duplicate any previous content, to cause the analytics system to produce the analytics outcome for the content item and to cache the analytics outcome.

The present disclosure will be more fully understood from the following detailed description of the embodiments thereof, taken together with the drawings in which:

DETAILED DESCRIPTION OF EMBODIMENTS

Overview

Figure 1:
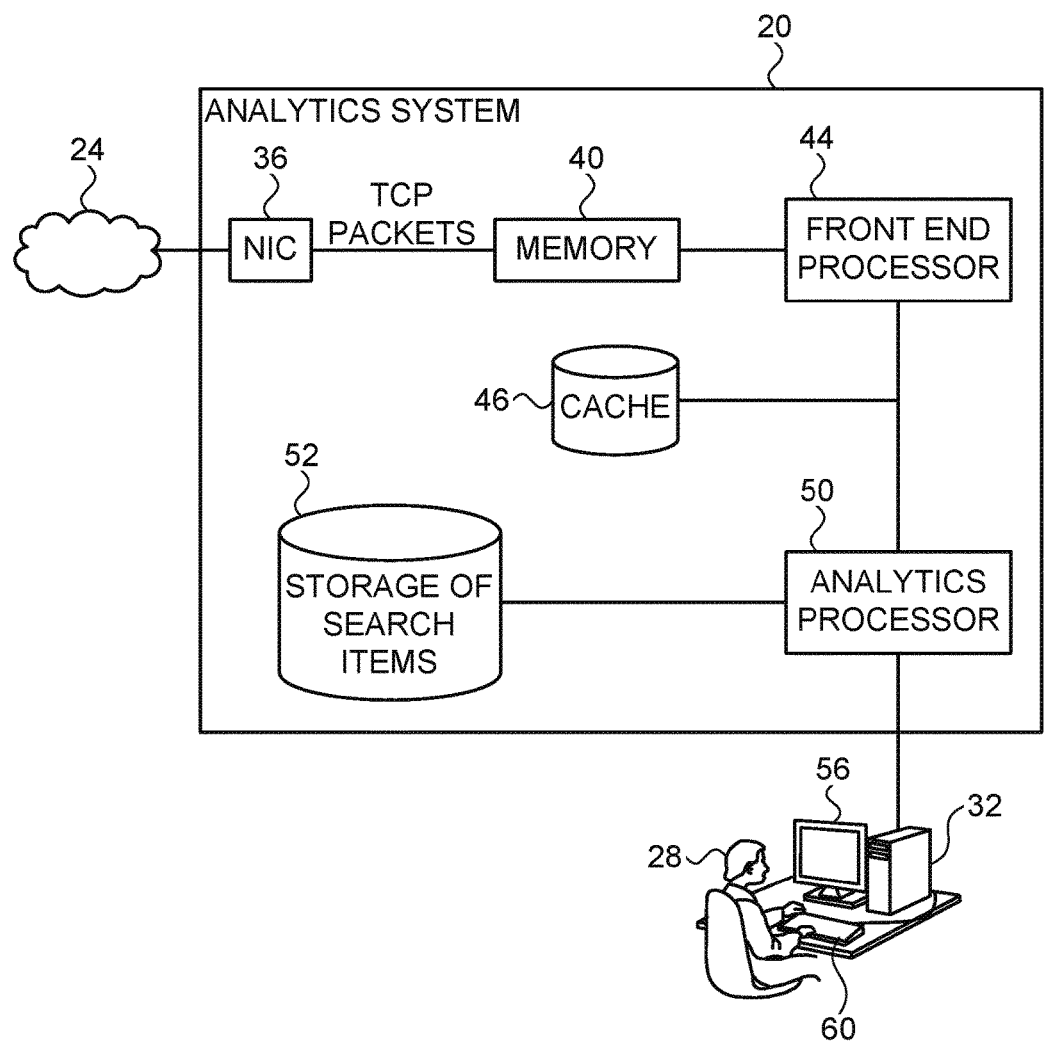
FIG. 1 is a block diagram that schematically illustrates an analytics system, in accordance with an embodiment that is described herein.

Network nodes and users communicate, for example, by sending, consuming, and/or sharing various types of content. Examples of content types include web pages, electronic mails (e-mails), documents, and multimedia. In addition, some of the communication traffic may be created by malicious activity of malware or software viruses. Analytics systems often receive large amounts of such network traffic for processing. To handle the full received traffic, analytics systems typically allocate considerable computational and storage resources.

In many cases, certain content is delivered over the network more than once, i.e., occurs within the network traffic multiple times. For example, many users may access a popular web page, or consume popular multimedia content. As another example, an organization may deliver a message or a document, via e-mail, to a large group of recipients. The duplicate occurrences of content in the traffic create unnecessary excess burden on the analytics system.

In some cases, multiple copies of a given content item are stored in different physical or logical locations. In such cases, different end users may access the same content (i.e., copies thereof) using different Uniform Resource Locators (URLs). For example, popular content may be delivered to end users by several content providers, who each locally stores copies of that content. As another example, in Content Delivery Networks (CDNs) copies of certain content may be stored in multiple servers, and delivered to end users based on the geographical proximity to the servers.

Embodiments that are described herein provide improved methods and systems for analyzing network traffic. The disclosed embodiments enable an analytics system to perform complex processing to only new, first occurrences of received content, while refraining from processing duplicate instances of that content. In a typical embodiment, the analytics results regarding the first occurring content are reported and cached in association with the content. For any duplicate instance of the content, the analytics results are retrieved from the cache without re-processing of the duplicate content.

These embodiments thus significantly reduce the required computational and storage resources, or increase the gross traffic volume that can be processed by the system. When using the disclosed techniques, the system still processes all first occurring content but not duplicate instances of content that was previously received and processed. In the embodiments described herein, input data comprises communication packets exchanged in a communication network.

In some embodiments, the system extracts content items from the input data (e.g., out of HTTP transactions) and assigns respective unique content identifiers to the content items. In an embodiment, different content items are mapped to different identifiers, whereas the duplicates of each content item are mapped to identical identifiers. A unique identifier may comprise, for example, the content itself (or part thereof). As another example, the identifier may comprise a compact representation of the content such as a digital signature calculated over the content item (or part thereof). A digital signature may comprise, for example, checksum, Cyclic Redundancy Check (CRC), or a hash message-digest such as, for example, MD5.

In some embodiments, the calculation of content identifiers excludes a predefined part of the content item, e.g., time stamps or other variable information that may be embedded within the content. In some embodiments, the content identifiers of duplicate copies of given content may differ up to some limited extent so that the given content item is still distinguishable from all other content items. For example, when generating identifiers for web pages, parts of the page that may vary from one occurrence to another (e.g., time stamps) are marked and later excluded when comparing web page identifiers.

When a given content item is received in the input data for the first time, the respective content identifier is stored in a cache memory. The size of the identifier may affect the performance accuracy of the system. In some embodiments, to achieve the highest accuracy, the entire content serves as an identifier and is cached.

The analytics system refrains from processing subsequent duplicates of the given content in the input data (if any) by finding that the identifiers of the duplicate content items match the identifier that was previously stored in the cache. Typically, however, the system still reports for each duplicate item, the same analysis result as cached and reported on the respective first occurrence of that content. Thus, only content items whose identifiers do not match any of the previously cached identifiers are assumed to be received for the first time and are subject to further deeper analysis.

Since performing analytics processing to a given content item is much more complex than producing a respective content identifier and searching for a matching identifier in the cache, the disclosed techniques efficiently handle traffic that carries duplicate content. In some embodiments, the analytics system employs multi-step search methods that enable fast termination of the search procedure by recognizing non-matching items in early steps of the search, thus reducing the search computational cost considerably. On the other hand, as earlier steps indicate possible matching, stronger and more accurate search method, with higher computational requirements, are applied.

The disclosed techniques are applicable to a variety of network analytics applications. In some embodiments, the analytics system is configured to detect in the input data occurrences of predefined search items and take suitable measures upon detection. In the context of the present patent application, the term "search items" may also refer to searching or analytics rules. Examples of search items include keywords and string patterns, multimedia items such as image, video, or audio, and URLs. In such embodiments, the predefined search items are typically stored in a dedicated storage. In an embodiment, when a content item is received for the first time and sent for analytics processing as described above, an analytic operation is applied to the content or to packets in the input data that are related to that content to find an occurrence of one or more search items. The results of analytics processing are reported, and are also cached in association with the identifier of the content item. The cached results are reported again for each duplicate occurrence of the content item, so that reporting cached instead of re-processed results is transparent to the system operator.

In some embodiments, a software virus or some other malware creates certain traffic patterns such as patterns of HTTP transactions in the network traffic. For example, malware-infected servers in the network may generate large amounts of spam traffic over short time periods. When a suspicious traffic pattern (e.g., related to spam traffic) is identified for the first time, the suspicious traffic pattern is stored in a cache memory and is subject to further analytics processing to detect whether the pattern was created by malware. The results of the analytics processing is cached in association with the traffic pattern. Duplicate occurrences of the suspicious pattern are matched to the previously stored pattern and their analytics processing outcomes are retrieved from the cache without analytics processing. The disclosed techniques thus free up computational resources for malware processing and detection.

The disclosed techniques enable to filter out content that was previously received and processed by the analytics system. By processing each content item only once, reporting respective cached analytics results, and refraining from superfluous processing of duplicate content, computational and hardware resources are reduced without sacrificing the analytics performance of the system.

System Description

FIG. 1 is a block diagram that schematically illustrates an analytics system 20, in accordance with an embodiment that is described herein. System 20 receives communication traffic from a communication network 24, and attempts to detect in the traffic predefined data elements such as textual phrases or multimedia contents. In the context of the present patent application, the predefined data elements to be searched are also referred to as keywords or search items. When one or more search items are detected, the system reports the detection to a user 28 using an operator terminal 32.

System 20 can be used, for example, in an intrusion detection system (IDS) application. In IDS applications, the system searches for occurrences of certain signature patterns. The patterns may include, for example, Regular Expression (Regex) rules as used, for example, in Snort®, which is an open source network intrusion prevention and detection system.

Alternatively, system 20 can be used in any other suitable application in which input data is searched for occurrences of keywords (e.g., textual keywords or certain character strings), detection of spam e.g., in electronic mail (e-mail) systems, or detection of inappropriate content using a dictionary of inappropriate words or phrases. Additionally or alternatively, system 20 may be used for detecting occurrences of predefined multimedia content in the input data.

System 20 can also be used in data leakage prevention (DLP) applications, which detect data leakage from a communication network. In applications of this sort, the presence of one or more search items in a data item indicates that this data item should not be allowed to exit the network. Further additionally or alternatively, system 20 can be used for detecting communication sessions (e.g., spam) created by viruses or other malware.

Although the embodiments described herein refer mainly to processing of communication traffic, the disclosed techniques can also be used in other domains. For example, system 20 can be used for locating data of interest on storage devices, such as in forensic disk scanning applications. Other applications may comprise, for example, pattern matching in gene sequences in biology.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments are suitable, for example, for applications such as intrusion detection and prevention, data leakage prevention, antivirus or spam detection, or monitoring of inappropriate content.

Typically, although not necessarily, network 24 comprises an Internet Protocol (IP) network, and the communication traffic comprises IP packets. The description that follows focuses on web traffic, which is communicated using the Hyper Text Transfer Protocol (HTTP). In addition, in the description below, we also assume that network transmission is carried out using the Transmission Control Protocol Internet Protocol (TCP/IP) and TCP packets. Alternatively, however, the methods and systems described herein can be used with any other suitable networks and protocols, packet types, and content types. For example, other packet types may include User Datagram Protocol (UDP) packets. As another example, various data types may include Flash or video streams, images, audio, e-mail, and the like. Regardless of protocol, the packets (or possibly a higher level of abstraction of the data traffic via a suitable protocol) searched by system 20 are referred to herein generally as input data or network traffic.

In the example of FIG. 1, system 20 comprises a Network Interface Card (NIC) 36, which receives TCP packets from network 24. NIC 36 thus serves as an input circuit that receives the input data to be searched. NIC 36 stores the incoming TCP packets in a memory 40, typically comprising a Random Access Memory (RAM). A front end processor 44 extracts from the stored TCP packets (typically from the packets payload) certain content items and produces a respective content identifier per each content item. Examples of various content identifiers are described further below.

In some embodiments, the extracted content items may comprise structured data such as HTML web pages, URLs, multimedia items such as Flash streams, images, video clips, or audio, or some digital representation thereof. In alternative embodiments, a content item comprises the payload of one or more TCP packets.

In the description that follows the term "first-occurring content" refers to the first occurrence of a given content item, and duplicate content items refer to one or more subsequent duplicate occurrences of the given content item in the input data (assuming the given item is already cached). Note that the term first-occurring refers to any non-cached content, such as, for example, content that was deleted from the cache while eliminating old content, or because of cache size limitations. Front end processor 44 selectively stores content identifiers of the extracted content items in a cache memory 46 and uses the cached identifiers to filter out duplicate content items as described below. In some embodiments, front end processor 44 indicates to an analytics processor 50 only of first-occurring content items detected in the input data.

As described above, when a certain content item is firstly received by system 20, analytics processor 50 accepts from front end processor 44 a respective indication. Analytics processor 50 then searches the input data stored in memory 40 (e.g., TCP packets from which the content item was extracted) and attempts to identify occurrences of predefined search items in the input data. As described above, front end processor 44 can extract content items from the input data at different data or communications layers, such as TCP packets, HTTP sessions, HTML pages, or video streams.

The predefined search items (e.g., keywords or string patterns) are stored in a search items storage 52. The search items may be stored on any suitable storage device. In some embodiments, all or part of the search items, may be stored in a cache memory (not shown) of analytics processor 50 to increase the access speed by the analytics processor. In some embodiments, such as embodiments in which system 20 searches for textual keywords, storage 52 may comprise multiple physical or logical distinct dictionaries.

When analytics processor 50 detects a given search item in a given packet (or packets), the analytics processor reports the detection to user 28 using an output device of terminal 32, such as a display 56. For example, the analytics processor may issue an alert to the user and/or present the data item (e.g., packet or session) in which the search item was detected. In some embodiments, analytics processor 50 may take various kinds of actions in response to detecting a search item. For example, in a data leakage or intrusion prevention application, analytics processor 50 may generate an indication to block some or all of the traffic upon detecting a search item. User 28 may interact with system 20 using an input device of terminal 32, e.g., a keyboard 60.

The system configuration shown in FIG. 1 is an example configuration, which is chosen purely for the sake of conceptual clarity. Alternatively, any other suitable system configuration can be used. For example, in some embodiments system 20 comprises a single processor, which handles all the tasks that are typically carried out separately by front end processor 44 and analytics processor 50 as described above. Generally, the different elements of system 20 may be implemented using software, hardware or a combination of hardware and software elements. Cache 46 and storage 52 may comprise any suitable type of memory, such as solid state memory or magnetic storage devices.

In some embodiments, analytics processor 50, front end processor 44, or both comprise general-purpose processors, which are programmed in software to carry out the functions described herein. The software may be downloaded to the processors in optical or electronic form, over a network, for example, or it may, additionally or alternatively, be provided and/or stored on non-transitory tangible media, such as magnetic, optical, or electronic memory.

Content Identifiers

System 20 may be configured to handle various types of content items. As a result, various types of content identifiers may be required accordingly. For example, in some embodiments, the content items comprise Uniform Resource Locators (URLs). A URL typically comprises a character string that identifies a certain resource or content in the network. In principle, the URL string itself can serve as the content identifier of the URL. In such embodiments, system 20 would process only the first content received from a given URL, and report (without re-processing) the same analytics results as reported and cached on the first occurrence, for subsequent content from the same URL.

In some cases, however, different instances of a URL of a given resource may comprise different character strings. For example, parts of the URL may comprise a time stamp or some other variable information. In some embodiments, processor 44 may calculate a unique identifier by excluding from the URL string any varying information. Similarly, front end processor 44 can automatically detect and ignore variable data in web pages, such as time and date elements.

As another example, copies of a certain content item may be stored in multiple network locations accessed using different URLs. Front end processor 44 may use suitable means, such as mapping functions or tables, to associate the different URLs (of copies of the same content) with a unique identifier.

In some embodiments, for example, when high accuracy is required, finding a matching URL in the cache is not sufficient for duplicate detection. In such embodiments, following URL matching, front end processor 44, further searches for duplicate content in the network location to which the URL directs.

In other cases, the input data comprises multimedia content items. A multimedia content item may comprise, for example, an image, video, Flash stream, or audio. Multimedia content typically comprises data that is formatted and structured according to some respective standard or specification. In some embodiments, front end processor 44 extracts the multimedia content from the payload of one or more packets in memory 40. The front end processor then produces a respective content identifier by calculating a unique digital signature. System 20 then processes only the first content having a certain signature, and stores the result of the analytics analysis in the cache in association with the respective content identifier. Thus, system 20 can report the same analytics result (i.e., without actually performing processing) of subsequent content having a matching signature. This technique enables system 20 to refrain from processing duplicate content even if it is obtained from different URLs.

Front end processor 44 can use any suitable method for calculating (and comparing) digital signatures. In some embodiments, front end processor 44 performs a multi-step signature search or comparison. In multi-step search, non-matching signatures can be excluded at early steps of the search, thus reducing the overall searching cost. For example, the identifier may comprise multiple signatures of different strength and computational complexity. Front end processor 44 may terminate the search when a low complexity signature is sufficient for deciding on identifier mismatch. If however, earlier steps indicate a possible match, stronger and more accurate signatures are used. Selecting a suitable signature involves a tradeoff. On one hand, the computational effort to produce and compare signatures should be small so that filtering out duplicate content would be efficient. On the other hand, however, the digital signature should be strong enough to minimize the probability that a content item is wrongly identified and filtered out. Example signatures for multimedia content include checksum, Cyclic Redundancy Check (CRC) and hash message-digest such as MD5.

In some embodiments, instead of calculating the digital signature over the entire multimedia content, front end processor 44 calculates the signature over part of the content, such as over a sufficiently large number of bytes. The range of bytes may be selected at the beginning of the content structure or at some offset. This feature makes the signature processing and performance agnostic to the content size.

Moreover, in some cases, duplicate copies of the same content may still differ in a small number of bytes. For example, copies of the same video clip or web page may have different time stamps. By omitting these variable bytes from the signature calculation, system 20 is able to detect and discard duplicate copies regardless of these small variations.

As another example, the content items comprise web pages in which system 20 should search for predefined keywords. In principle, front end processor 44 can use digital signatures to serve as content identifiers of web pages. Web pages, however, often comprise constant as well as variable information. Such variable information may comprise, for example, frequently updated string links to other web pages or content. To produce a unique identifier of a web page, front end processor 44 calculates a digital signature of the web page excluding any information that may change in subsequent accesses. For example, when a web page comprises a link to an advertisement item, front end processor 44 can ignore the link in the page and cache the advertisement item itself.

In some embodiments, system 20 is configured to recognize and alert upon detecting communication sessions that may be created by servers infected by some malware software (e.g., spam sessions). Such communication sessions are often characterized by the malware software creating unique traffic patterns, e.g., patterns of HTTP transactions. Front end processor 44 identifies in the input data a suspicious traffic pattern. Similarly to handling content items, the suspicious pattern is cached in memory cache 46 and sent to analytics processor 50 only once. Subsequent occurrences of the same traffic pattern are recognized by front end processor 44 matching the pattern to the already cached traffic pattern. To increase the search efficiency, processor 44 can cache and detect strings comprising multiple traffic patterns. In some embodiments, instead of using the traffic pattern itself as identifier, front end processor 44 calculates an identifier for the traffic pattern by calculating a suitable digital signature over the pattern.

Conditional Analysis by Caching Content Identifiers

Front end processor 44 distinguishes between content items based on similarity among their respective content identifiers. In some embodiments, front end processor 44 maps all the duplicates of a given content item to a single unique content identifier. For example, a digital signature such as checksum, which is calculated over identical content items (or identical parts thereof), can serve as a unique identifier for duplicate content items.

For instance, front end processor 44 can produce identical identifiers for duplicate content items by calculating signatures over the content items, excluding information that may vary among the duplicates. In alternative embodiments, content identifiers of duplicate content items may differ up to some limited extent, so that front end processor 44 can still distinguish (e.g., using a suitable similarity measure) between duplicate and other (i.e., non-duplicate) content items. Content identifiers that uniquely correspond to a certain content item and to all its duplicates are referred to herein as matched content identifiers.

Following the calculation of a content identifier, front end processor 44 searches in cache 46 for a respective matched content identifier. If front end processor 44 fails to find a matched content identifier, the given content is assumed to be received for the first time (i.e., first-occurring content) and the front end processor stores the respective content identifier in cache 46 and informs analytics processor 50 of detecting the first-occurring content item. When high accuracy is required, the identifier may comprise the entire content item. Analytics processor 50 then analyses the content and stores the results in cache 46 in association with the respective content identifier. On the other hand, if front end processor 44 finds in cache 46 a matching identifier, the given content item is assumed to be a duplicate of a content item whose content identifier and respective analysis results were previously stored in cache 46. Front end 44 typically reports for the duplicate detected content, the same respective analytics result that was previously cached, without informing of the detection to analytics processor 50. As a result, a given content item is cached in memory cache 46 and processed by analytics processor 50 only once.

When analytics processor 50 receives an indication of receiving first-occurring content, the analytics processor performs a respective analytics operation on the content items or on packets from which the content was extracted. Analytics processor 50 can perform any suitable analytics operation, based on the content type. For example, when analytics processor 50 receives an indication of a suspicious traffic pattern, such as HTTP transactions pattern (e.g., spam), the analytics processor further analyzes the packets from which the pattern was extracted to identify the specific malware involved.

In some embodiments, front end processor 44 counts the number of duplicates of each content item that arrive in the network during a given time duration. In these embodiments, processor 44 typically caches this number in cache 46 in association with the respective content identifier. This feature enables analytics processor 50 to recognize cyber-attacks over the network. The feature additionally enables to delete from the cache content identifiers that are not in use (i.e., did not match any input data) for a long time, thus improving the utilization of the cache. In some embodiments, processor 44 multiplies the number of matching occurrences by a suitable weight factor that may be based, for example, on the processing time (by the analytics processor) of analyzing content items that are identified by the counted identifiers.

In some embodiments, processor 44 caches for each cached content identifier a list of (one or more) matched rules. For example, if processor 44 finds that a certain image is of inappropriate content, it caches a corresponding indication in association with the content identifier of that image. As another example, if a web page is found as innocent (i.e., the page does not match any rule) processor 44 caches a suitable indication in association with the content identifier of this page, in order not to check it again.

In some embodiments, the search items (or searching rules) stored in storage 52 may occasionally change. As a result, some of the already cached identifiers may become irrelevant. Thus, upon changing at least some of the searching rules, front end processor 44 can delete all the cached identifiers. This, however, may result in temporal computational peak, since all the traffic received following the cache clearance is first-occurring content that should be analyzed. Thus, in an embodiment, when a given rule is removed, instead of clearing the entire cache, front end processor 44 scans the cache and removes only analytics results that were produced by that rule. In alternative embodiments, if the rules change (e.g., new rules are added or existing stored rules are replaced with other rules) relates to searching rules that are defined for only a specific content or media type, front end processor 44 can delete from the cache only content identifiers of the respective content or media type, and retain identifiers of other content types. In yet other embodiments, upon storing a new searching rule in storage 52, analytics processor 50 scans all (or part of) the cached identifiers, and updates the respective cached analytics results.

In some embodiments, upon rules change, instead of deleting all the respective content identifiers from the cache in a single batch, front end processor 44 can be configured to flatten the processing peak by sequentially deleting only part of the identifiers at a time, e.g., periodically.

Figure 2:
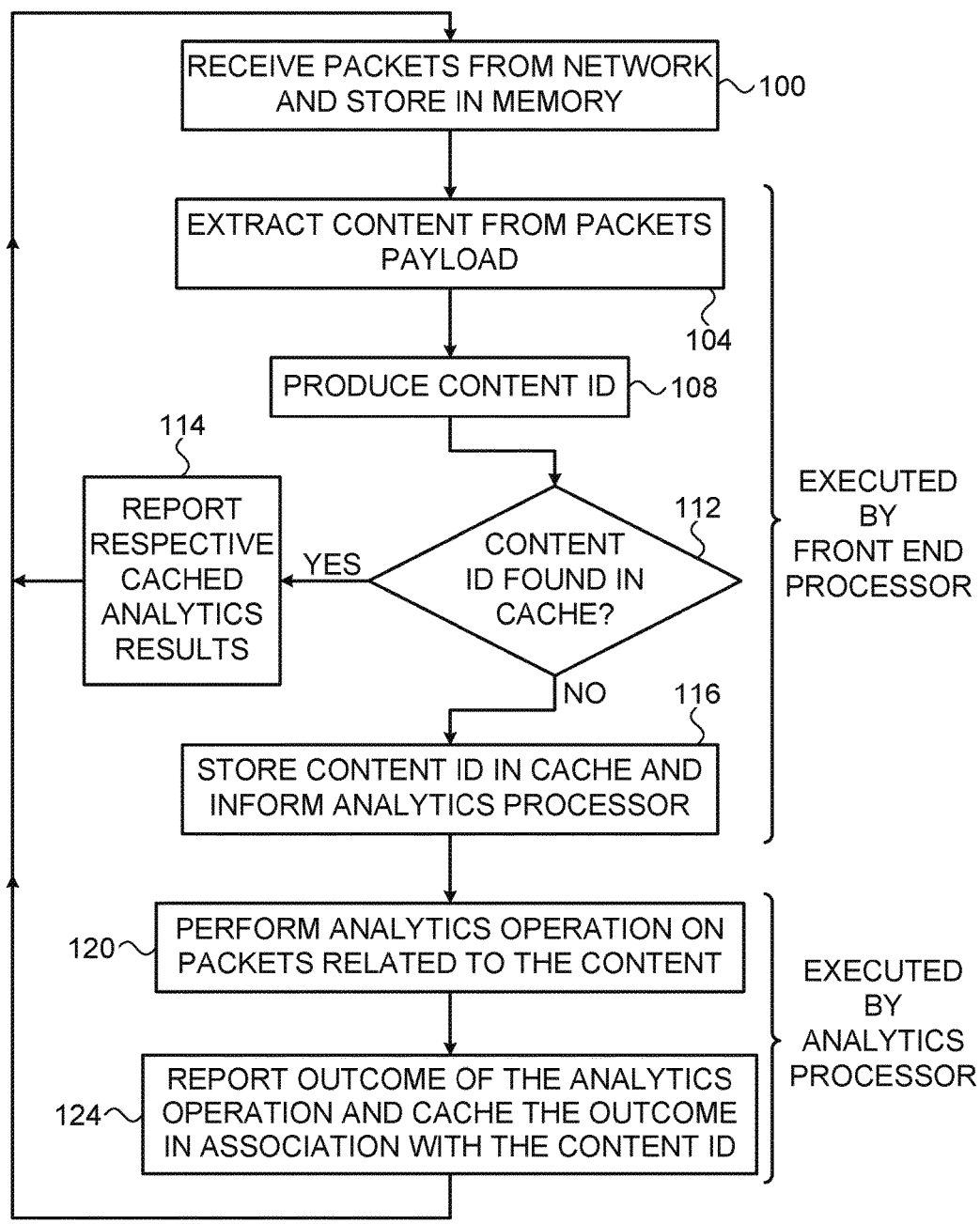
FIG. 2 is a flow chart that schematically illustrates a method for conditional analysis of network traffic, in accordance with an embodiment that is described herein.

FIG. 2 is a flow chart that schematically illustrates a method for conditional analysis of network traffic, in accordance with an embodiment that is described herein. The method is carried out jointly by front end processor 44 and analytics processor 50 (and possibly by other elements of system 20 such as NIC 36). The method begins with System 20 receiving packets (referred to as input data) from network 24 via NIC 36, and storing the packets in RAM 40, at an input step 100. Front end processor 44 extracts one or more content items from the stored packets, at an extraction step 104, and produces, for each content item, a respective content identifier, at an identifier generation step 108. Methods for calculating content identifiers of various content types are described above.

At a cache searching step 112, front end processor checks whether an identifier, which is identical to the content identifier, is already stored in cache 46. Finding an identical identifier (at step 112) means that the content item at hand is a duplicate of a content item that was previously received and analyzed by system 20, and therefore the method does not send the content item for analysis, but rather reports, at a reporting step 114, cached analysis results, which were previously associated in the cache with the content identifier, and loops back to step 100 to receive subsequent input data. If at step 112, front end processor 44 fails to find an identical content identifier in cache 46, the content item at hand is assumed to be received by system 20 for the first time. Front end processor 44 then stores the content identifier calculated at step 108 in cache 46 at a caching step 116, so that future duplicates of that content (if any) can be detected in subsequent input data. Further at step 116, front end processor 44 indicates to analytic processor 50 of the firstly received content item.

Upon receiving the indication from front end processor 44, analytics processor 50 performs a respective analytics operation at an operation step 120. Performing the analytics operation by analytics processor 50 typically involves searching in the content item for occurrences of search items, which are stored beforehand in storage 52. Additionally or alternatively, analytics processor 50 searches for occurrences of the search items in packets (in memory 40) that are related to the content item.

After performing the analytics operation at step 120, the analytics processor reports to user 28 (e.g., via display 56 of terminal 32) of any search items found, at a reporting step 124. Further at step 124, the analytics processor stores the results of the analytics operation in the cache memory in association with the respective content identifier. Next, the method loops back to step 100 to receive subsequent input data.

The configuration of system 20 described above is an example configuration, which is chosen purely for the sake of conceptual clarity. In alternative embodiments, any other suitable configuration can also be used. For example, in the description of FIGS. 1 and 2 above, upon detecting a duplicate content item, front end processor reports the cached analytics results related to the content item without reporting to analytics processor 50. In alternative embodiments, front end processor 44 logs the events of detecting duplicate content. The logged events can be analyzed by analytics processor 50 to identify patterns of possible cyber-attacks. For example, when analytics processor 50 detects that a certain URL occurs in the traffic at a rate that is significantly higher than the average expected rate, the analytics processor generates a suitable alert to user 28.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving network traffic that carries content items for processing by a network analytics system;
extracting a content item from the network traffic, wherein extracting the content item includes deriving a respective unique identifier for the content item;
in response to finding that the content item is a duplicate of previous content that was already processed by the network analytics system and cached in a cache memory, retrieving and outputting a cached analytics outcome of the content item from the cache memory;
for a given content item, counting a number of matching occurrences of the given content item, and caching the number of matching occurrences in the cache memory in association with a unique identifier of the given content item, wherein the number of matching occurrences is multiplied by a weight factor that is based on a processing time of the content item to produce a weighted number of matching occurrences; and
deleting from the cache memory the unique identifier of the given content item if the weighted number of matching occurrences during a predefined duration is lower than a predefined threshold;
wherein the network analytics system produces analytics outcomes based on an analytics rule, and comprising, upon changing the analytics rule, updating cached analytics outcomes for the content items for which the analytics rule was applied.

2. The method according to claim 1 further comprising, in response to finding that the content item does not duplicate, causing the network analytics system to produce the analytics outcome for the content item, and caching the analytics outcome, wherein the step of finding that the content item does not duplicate includes validating that the unique identifier does not match any identifier in the cache memory that caches identifiers of previous content items that were processed by the network analytics system.

3. The method according to claim 2 further comprising, in response to finding that the content item does not duplicate, caching the unique identifier of the content item, and the analytics outcome produced for the content item by the network analytics system, in the cache memory in association with the unique identifier.

4. The method according to claim 2, wherein deriving the unique identifier comprises composing the unique identifier from at least part of a Uniform Resource Locator (URL) in which the content item resides.

5. The method according to claim 4, wherein the at least part of the URL is chosen to exclude a variable section of the URL.

6. The method according to claim 2, wherein extracting the content item comprises extracting a traffic transaction created by servers that are infected by malware, and wherein deriving the unique identifier comprises deriving a pattern of the traffic transaction.

7. The method according to claim 2, wherein deriving the unique identifier comprises calculating a digital signature over at least part of the content item.

8. The method according to claim 7, wherein calculating the digital signature comprises calculating the digital signature over only a predefined portion of the content item.

9. The method according to claim 8, wherein the predefined portion is chosen to exclude a section of the content item that varies among duplicates of the content item.

10. The method according to claim 2, wherein the unique identifier comprises a first signature and a second signature, which is stronger than the first signature, and wherein validating that the unique identifier does not match any identifier in the cache memory comprises checking the second signature only if checking the first signature is not sufficient for deciding that the identifier does not match.

11. The method according to claim 1, wherein extracting the content item comprises recognizing HTTP transactions in the network traffic and extracting the content item from the HTTP transactions.

12. The method according to claim 11, wherein the content item comprises a multimedia content.

13. The method according to claim 1, wherein changing the analytics rule comprises removing the analytics rule, and wherein updating the analytics outcomes comprises deleting the cached content items for which the analytics rule was applied.

14. The method according to claim 1, wherein changing the analytics rule comprises changing the analytics rule with respect to a given content type, and wherein updating the analytics outcomes comprises removing the cached content items of the given content type.

15. The method according to claim 1, wherein changing the analytics rule comprises replacing the analytics rule with a new analytics rule, which is different from the analytics rule, and wherein updating the analytics outcomes comprises producing new analytics outcomes by applying the new analytics rule to the content items and replacing the cached analytics outcomes with the new analytics outcomes.

16. An apparatus, comprising:
an input circuit, which is configured to receive network traffic that carries content items for processing by a network analytics system; and
a processor coupled to a memory, which is configured to:
extract a content item from the network traffic, wherein extracting the content item includes deriving a respective unique identifier for the content item;
retrieve and output a cached analytics outcome of the content item from a cache memory in response to finding that the content item is a duplicate of a previous content that was already processed by the network analytics system and cached in the cache memory;
count, for a given content item, a number of matching occurrences of the given content item, and caching the number of matching occurrences in the cache memory in association with a unique identifier of the given content item, wherein the number of matching occurrences is multiplied by a weight factor that is based on a processing time of the content item to produce a weighted number of matching occurrences; and
delete from the cache memory the unique identifier of the given content item if the weighted number of matching occurrences during a predefined duration is lower than a predefined threshold;
wherein the network analytics system produces analytics outcomes based on an analytics rule, and comprising, upon changing the analytics rule, updating cached analytics outcomes for the content items for which the analytics rule was applied.

17. The apparatus of claim 16, wherein the processor is further configured to in response to finding that the content item does not duplicate, cause the network analytics system to produce the analytics outcome for the content item, and to cache the analytics outcome, wherein the processor is configured to find whether the content item does not duplicate by at least validating that the unique identifier does not match any identifier in the cache memory that caches identifiers of previous content items that were processed by the network analytics system.

18. A non-transitory computer readable medium, having instructions stored thereon that, when executed by a computing system, cause the computing system to at least:
receive network traffic that carries content items for processing by a network analytics system;
extract a content item from the network traffic, wherein extracting the content item includes deriving a respective unique identifier for the content item;
retrieve and output a cached analytics outcome of the content item from a cache memory in response to finding that the content item is a duplicate of previous content that was already processed by the network analytics system and cached in the cache memory;
count, for a given content item, a number of matching occurrences of the given content item, and caching the number of matching occurrences in the cache memory in association with a unique identifier of the given content item, wherein the number of matching occurrences is multiplied by a weight factor that is based on a processing time of the content item to produce a weighted number of matching occurrences; and
delete from the cache memory the unique identifier of the given content item if the weighted number of matching occurrences during a predefined duration is lower than a predefined threshold;
wherein the network analytics system produces analytics outcomes based on an analytics rule, and comprising, upon changing the analytics rule, updating cached analytics outcomes for the content items for which the analytics rule was applied.

* * * * *